United States Patent
Toida et al.

(10) Patent No.: US 10,074,865 B2
(45) Date of Patent: Sep. 11, 2018

(54) FUEL CELL SYSTEM AND FUEL CELL SYSTEM CONTROL METHOD

(71) Applicant: TOYOTA JIDOSHA KABUSHIKI KAISHA, Toyota-shi, Aichi-ken (JP)

(72) Inventors: Masashi Toida, Nagoya (JP); Yoshiaki Naganuma, Toyota (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 272 days.

(21) Appl. No.: 14/939,537

(22) Filed: Nov. 12, 2015

(65) Prior Publication Data
US 2016/0141665 A1    May 19, 2016

(30) Foreign Application Priority Data
Nov. 14, 2014  (JP) .................. 2014-231961

(51) Int. Cl.
| | | |
|---|---|---|
| *H01M 8/04* | (2016.01) | |
| *H01M 8/04223* | (2016.01) | |
| *H01M 8/04089* | (2016.01) | |
| *H01M 8/0432* | (2016.01) | |
| *H01M 8/04746* | (2016.01) | |
| *H01M 8/04303* | (2016.01) | |
| *H01M 8/04082* | (2016.01) | |

(Continued)

(52) U.S. Cl.
CPC ..... *H01M 8/04253* (2013.01); *H01M 8/0432* (2013.01); *H01M 8/04097* (2013.01); *H01M 8/04201* (2013.01); *H01M 8/04303* (2016.02); *H01M 8/04373* (2013.01); *H01M 8/04753* (2013.01); *H01M 2008/1095* (2013.01)

(58) Field of Classification Search
CPC ............. H01M 8/04223–8/04268; H01M 8/04298–8/04303; H01M 8/04313–8/04373; H01M 8/04694–8/04738
See application file for complete search history.

(56) References Cited

U.S. PATENT DOCUMENTS

2003/0232226 A1* 12/2003 Morishima ....... H01M 8/04029 429/413
2005/0112424 A1  5/2005 Hirano et al.
2009/0169928 A1* 7/2009 Nishimura ........ H01M 8/04037 429/415

FOREIGN PATENT DOCUMENTS

| JP | 2005-158426 A | 6/2005 |
| JP | 2007-24015 | 2/2007 |
| JP | 2007-035517 A | 2/2007 |

(Continued)

*Primary Examiner* — Jonathan Crepeau
*Assistant Examiner* — Jacob Buchanan
(74) *Attorney, Agent, or Firm* — Finnegan, Henderson, Farabow, Garrett & Dunner LLP

(57) ABSTRACT

To provide technology that is capable of inhibiting a decrease in starting properties of a pump in a low-temperature environment. A fuel cell system is equipped with a control unit, a fuel cell, and a pump. The control unit acquires the temperature of the fuel cell as a parameter expressing the temperature of the pump while operation of the fuel cell is stopped. The control unit rotates rotation body of the pump when it is detected that the temperature of the pump is a threshold value or less set within a predetermined range lower than the freezing point based on the detected temperature of the fuel cell.

12 Claims, 5 Drawing Sheets

(51) Int. Cl.
*H01M 8/10* (2016.01)
*H01M 8/1018* (2016.01)

(56) References Cited

FOREIGN PATENT DOCUMENTS

| | | |
|---|---|---|
| JP | 2008-019727 A | 1/2008 |
| JP | 2008-059977 A | 3/2008 |
| JP | 2008-077959 A | 4/2008 |
| JP | 2009-138713 | 6/2009 |

\* cited by examiner

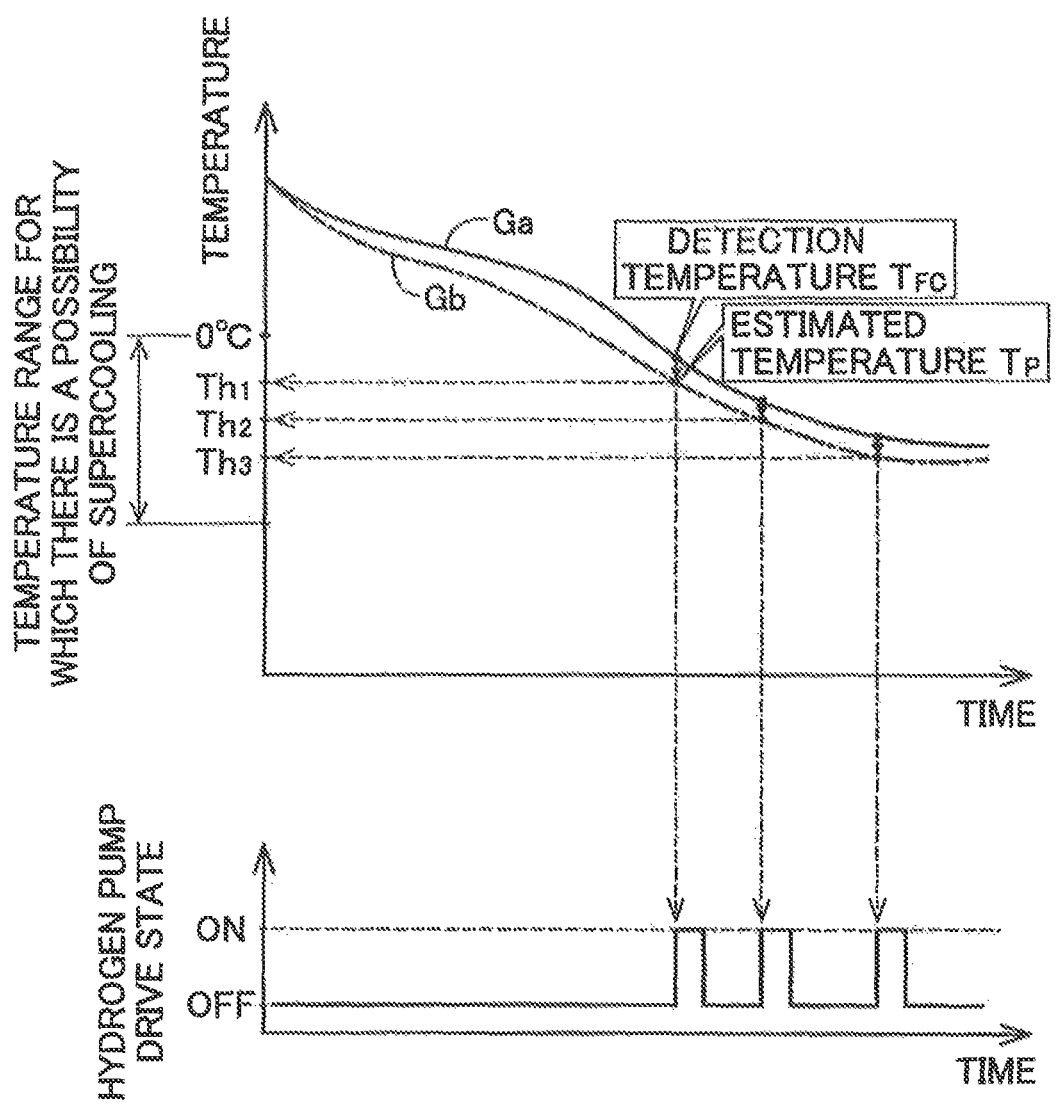

FUEL CELL SYSTEM AND FUEL CELL SYSTEM CONTROL METHOD

CROSS-REFERENCE TO RELATED APPLICATIONS

This application claims priority rights based on the Japanese patent application of Application No. (JP) 2014-231961 applied for on Nov. 14, 2014, and all the disclosures thereof are incorporated herein by reference

BACKGROUND

Field

The present invention relates to a fuel cell system and a fuel cell system control method.

Related Art

With a fuel cell system equipped with a polymer electrolyte fuel cell (hereafter also simply referred to as a "fuel cell"), there are cases of using a pump equipped with a rotating body that is also called a rotor to supply reaction gas to the fuel cell. As a hydrogen pump for circulating hydrogen exhausted from an outlet of the anode of the fuel cell to the inlet of the anode of the fuel cell, typically, a roots type pump is used (e.g. JP 2009-138713, JP2007-024015 or the like).

The moisture generated by the power generation reaction of the fuel cell flows into the hydrogen pump which is used for circulation of hydrogen together with exhaust gas. In a low-temperature environment, such as sub-zero, there are cases that the rotating body and the case are adhered by the freeze of the moisture that remains within the hydrogen pump entering in the gap between the rotating body of the hydrogen pump and the wall surface of the case, which is the casing for housing the rotating body. Because of that, there is the problem that starting of the hydrogen pump becomes difficult when operation of the fuel cell is started. This kind of problem is not limited to roots type hydrogen pumps used for the circulation of hydrogen in the fuel cell systems, but is a problem that is common to pumps equipped with a rotating body used for the fuel cell systems.

SUMMARY

In order to solve at least part of the problems described above, the present invention may be implemented by the following aspects.

(1) According to a first aspect of the present invention, there is provided a fuel cell system. This fuel cell system may comprise a fuel cell, a pump and a control unit. The pump may include a rotating body and a case for housing the rotating body, and may be used to supply reaction gas to the fuel cell. The parameter acquisition unit may acquire a parameter expressing the temperature of the pump. The control unit may control driving of the pump. The control unit may execute a rotating body drive process that rotates the rotating body of the pump for a predetermined period when it is detected based on the parameters that the temperature of the pump is equal or less than a threshold value set within a predetermined range lower than the freezing point while the fuel cell operation is stopped. With the fuel cell system of this aspect, adhesion of the rotating body of the pump clue to freezing is suppressed, and reduction of the startability of the fuel cell system in low-temperature environments is suppressed.

(2) In the fuel cell system of the above aspect, the control unit may store a plurality of threshold values as the threshold value, and the control unit may determine whether it is possible to execute each rotating body drive process using a threshold value among the plurality of threshold values smaller than a previous threshold value used in the previous executed rotating body drive process for each execution of the rotating body drive process. With the fuel cell system of this aspect, the rotating body drive process is executed a plurality of times in accordance with a decrease in the pump temperature, so adhesion of the rotating body of the pump due to freezing is more reliably suppressed.

(3) In the fuel cell system of the above aspect, the control unit may execute the rotating body drive process a plurality of times. With the fuel cell system of this aspect, adhesion of the rotating body of the pump due to freezing is further suppressed.

(4) In the fuel cell system of the above aspect, the controller may obtain a measurement value of the temperature of the fuel cell, and acquire the temperature of the pump, which is obtained for the measurement value of temperature of the fuel cell by using a relationship between a temperature of the fuel cell and the temperature of the pump that is prepared in advance, as the parameter expressing the temperature of the pump. With the fuel cell system of this aspect, it is possible to omit direct measurement of the pump temperature, so it is possible to suppress adhesion of the rotating body of the pump due to freezing, by a simple control.

(5) In the fuel cell system of the above aspect, with the rotating body drive process, the control unit may rotate the rotating body at a rotational speed smaller than the rotational speed of the pump during operation of the fuel cell. With the fuel cell system of this aspect, a decrease in the system efficiency by driving of the pump while the fuel cell operation is stopped is suppressed.

(6) In the fuel cell system of the above aspect, the pump may be a circulation pump that takes hydrogen exhausted from the fuel cell and sends it again to the fuel cell. With the fuel cell system of this aspect, adhesion of the rotating body of the pump due to freezing with a hydrogen circulation pump is suppressed.

(7) According to a second aspect of the present invention, there is provided a control method of a fuel cell system. The fuel cell system may include a pump which includes a rotating body and a case for housing the rotating body, and may be used to supply reaction gas to the fuel cell. The control method of the fuel cell system of this aspect may include a parameter acquisition step and a rotating body drive step. The parameter acquisition step may be a step for acquiring a parameter expressing the temperature of the pump while the operation of the fuel cell is stopped. The rotating body drive step may be a step for rotating the rotating body of the pump for a predetermined period when it is detected based on the parameters that the temperature of the pump is equal or less than a threshold value set within a predetermined range lower than the freezing point. With the fuel cell system of this aspect, adhesion of the rotating body of the pump due to freezing is suppressed, and reduction of the startability of the fuel cell system in low-temperature environments is suppressed.

The plurality of structural elements that each of the aspects of the present invention described above have are not all essential, and in order to address a portion or all of the problems described above, or to achieve a portion or all of the effects noted in the specification, it is possible to modify, eliminate, replace with a new other structural element, or do a partial elimination of the limiting content as appropriate for a portion of the structural elements among the plurality of structural elements. Also, to address a portion or all of the problems described above, or to achieve a portion or all of the effects noted in the specification, it is possible to combine a portion or all of the technical features included in one mode of the present invention described above with a portion or all of the technical features included in another mode of the present invention described above, and use that as one independent mode of the present invention.

The present invention may be actualized by any of various aspects other than the fuel cell system and the control method thereof. For example, it may also be actualized by a such as a pump control method or control device, a fuel cell system control device, a computer program for realizing the control method of the fuel cell system or the pump, a non-temporary recording medium for recording that computer program or the like.

BRIEF DESCRIPTION OF THE DRAWINGS

FIG. 5 is an explanatory drawing showing the drive timing of the hydrogen pump during execution of the freezing prevention process.

DESCRIPTION OF THE EMBODIMENTS

A. Embodiments:
A1. Fuel Cell System Constitution

Figure 1:
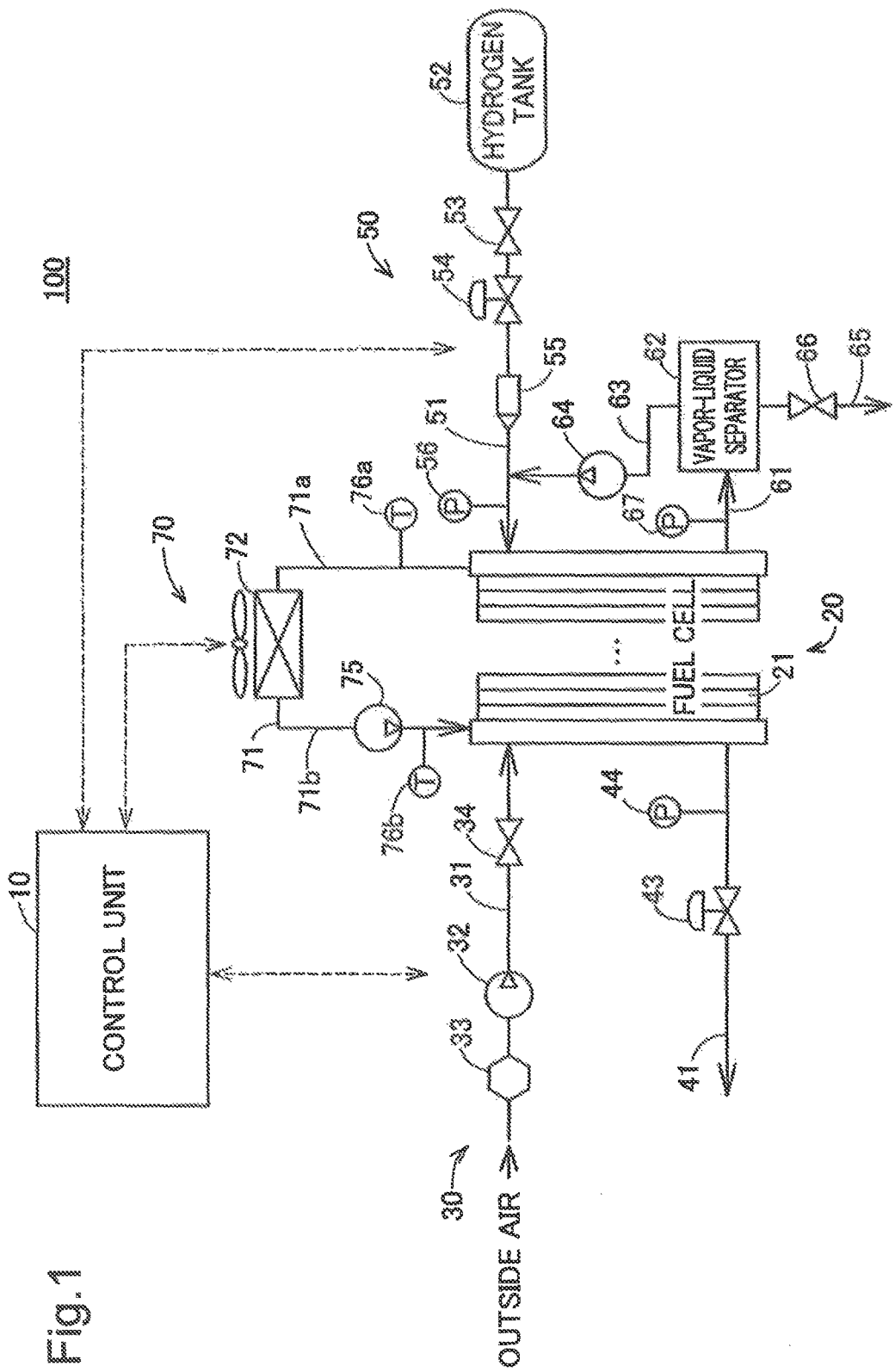
FIG. 1 is a schematic diagram showing the constitution of the fuel cell system.

FIG. 1 is a schematic diagram showing the constitution of a fuel cell system 100 as an embodiment of the present invention. This fuel cell system 100 is mounted in a fuel cell vehicle, and outputs power used as drive power according to a request from the driver. The fuel cell system 100 is equipped with a control unit 10, a fuel cell 20, a cathode gas supply unit 30, an anode gas supply unit 50, and a refrigerant supply unit 70.

The control unit 10 is constituted by a microcomputer equipped with a central processing unit and a main memory, and various functions are exhibited by reading programs on the main memory and executing them. The control unit 10 controls each constitutional unit of the fuel cell system 100, and has the function of executing operation control of the fuel cell 20 for which power is generated according to an output request to the fuel cell 20. The control unit 10 further has a function of executing the freezing prevention process to prevent freezing of the hydrogen pump 64 when operation of the fuel cell 20 is stopped. The freezing prevention process of the hydrogen pump 64 by the control unit 10 will be described later.

The fuel cell 20 is a polymer electrolyte type fuel cell that generates power by receiving supply of hydrogen (anode gas) and air (cathode gas) as reaction gas. The fuel cell 20 has a stack structure for which a plurality of unit cells 21 are laminated. Each unit cell 21 is a power generating element capable of respectively generating power even as a stand-alone unit, and has a membrane electrode assembly that is a power generating body for which electrodes are arranged at both sides of an electrolyte membrane, and two separators (not illustrated in figure) sandwiching the membrane electrode assembly. The electrolyte membrane is constituted by a polymer thin film showing good proton conductivity when in a wet state containing moisture on the interior.

The cathode gas supply unit 30 has a function of supplying cathode gas to the fuel cell 20, and a function of exhausting drainage water and cathode exhaust gas from the cathode-side of the fuel cell 20 to outside the fuel cell system 100. The cathode gas supply unit 30 is equipped with a cathode as piping 31, an air compressor 32, an air flow meter 33, and an on-off valve 34 at the upstream side of the fuel cell 20. The cathode gas piping 31 is connected to the inlet of the gas flow path of the cathode-side with the fuel cell 20. The air compressor 32 is connected to the fuel cell 20 via the cathode gas piping 31, and air for which outside air has been taken in and compressed is supplied to the fuel cell 20 as cathode gas.

The air flow meter 33 measures the volume of outside air taken in by the air compressor 32 at the upstream side of the air compressor 32 and sends it to the control unit 10. The control unit 10 controls the volume of air supplied to the fuel cell 20 by driving the air compressor 32 used on this measured value. The on-off valve 34 is provided between the air compressor 32 and the fuel cell 20. The on-off 34 is normally in a closed state, and opens when air having a predetermined pressure from the air compressor 32 is supplied to the cathode gas piping 31.

At the downstream side of the fuel cell 20, the cathode gas supply unit 30 is equipped with a cathode exhaust gas piping 41, a pressure regulating valve 43, and a pressure measuring unit 44. The cathode exhaust gas piping 41 is connected to the outlet of the gas flow path at the cathode-side with the fuel cell 20, and the drainage water and cathode exhaust gas are guided so as to be exhausted to outside the fuel cell system 100. The pressure regulating valve 43 regulates the back pressure of the cathode-side of the fuel cell 20 which is the pressure of the cathode exhaust gas with the cathode exhaust gas piping 41. The pressure measuring unit 44 is provided at the upstream side of the pressure regulating valve 43, measures the pressure of the cathode exhaust gas, and sends that measurement value to the control unit 10. The control unit 10 regulates the opening degree of the pressure regulating valve 43 based on the measurement value of the pressure measuring unit 44.

The anode gas supply unit 50 has a function of supplying anode gas to the fuel cell 20, a function of exhausting anode exhaust gas exhausted from the fuel cell 20 to outside the fuel cell system 100, and a function of circulating the anode gas inside the fuel cell system 100. At the upstream side of the fuel cell 20, the anode gas supply unit 50 is equipped with an anode gas piping 51, a hydrogen tank 52, an on-off valve 53, a regulator 54, a hydrogen supply device 55, and a pressure measuring unit 56. The hydrogen tank 52 is filled with high pressure hydrogen for supplying to the fuel cell 20. The hydrogen tank 52 is connected to the gas flow path inlet of the anode-side with the fuel cell 20 via the anode gas piping 51.

The on-off valve 53, the regulator 54, the hydrogen supply device 55, and the pressure measuring unit 56 are provided on the anode gas piping 51 from the hydrogen tank 52-side, which is the upstream side, in this order. The control unit 10 controls the inflow of hydrogen to the upstream side of the hydrogen supply device 55 from the hydrogen tank 52 by controlling the opening and closing of the on-off valve 53. The regulator 54 is a pressure reduction valve for regulating the pressure of the hydrogen at the upstream side of the hydrogen supply device 55, and its opening degree is controlled by the control unit 10. The hydrogen supply device 55 constituted, for example, by an injector which is an electromagnetic drive type on-off valve. The pressure measuring unit 56 measures the pressure of hydrogen at the downstream side of the hydrogen supply device 55, and sends that to the control unit 10. The control unit 10 controls the hydrogen volume supplied to the fuel cell 20 by controlling the drive cycle expressing the opening and closing timing of the hydrogen supply device 55 based on the measurement values of the pressure measuring unit 56.

At the downstream side of the fuel cell 20, the anode gas supply unit 50 is equipped with an anode exhaust gas piping 61, a vapor-liquid separator 62, an anode gas circulation piping 63, a hydrogen pump 64, an anode discharge water piping 65, a drain valve 66, and a pressure measuring unit 67. The anode exhaust gas piping 61 is piping that connects the anode-side outlet of the fuel cell 20 and the vapor-liquid separator 62. The pressure measuring unit 67 is provided on the anode exhaust gas piping 61. The pressure measuring unit 67 measures the back pressure of the anode-side of the fuel cell 20 which is the pressure of the anode exhaust gas near the outlet of the anode-side gas flow path with the fuel cell 20, and sends the measurement result to the control unit 10.

The vapor-liquid separator 62 connects the anode gas circulation piping 63 and the anode discharge water piping 65. The anode exhaust gas that flowed into the vapor-liquid separator 62 via the anode exhaust gas piping 61 is separated into vapor components and moisture by the vapor-liquid separator 62. Inside the vapor-liquid separator 62, the vapor component of the anode exhaust gas is guided to the anode gas circulation piping 63, and the moisture is guided to the anode discharge water piping 65.

The anode gas circulation piping 63 is connected downstream from the hydrogen supply device 55 of the anode gas piping 51. A hydrogen pump 64 is provided on the anode gas circulation piping 63. The hydrogen pump 64 functions as a circulation pump that sends to the anode gas piping 61 the hydrogen included in the vapor component separated by the vapor-liquid separator 62. With this embodiment, the hydrogen pump 64 is constituted by a roots type pump. The constitution of the hydrogen pump 64 will be described in detail later.

A drain valve 66 is provided on the anode discharge water piping 65. The drain valve 66 opens and closes according to commands from the control unit 10. The control unit 10 normally has the drain valve 66 closed, and closes the drain valve 66 at a preset predetermined draining timing or the timing of exhausting inert gas in the anode exhaust gas. The downstream end of the anode discharge water piping 65 is merged with the cathode exhaust gas piping 41 (illustration omitted) so as to make it possible for the anode-side drainage water and the anode exhaust gas to be mixed and exhausted with the cathode-side drainage water and cathode exhaust gas.

The refrigerant, supply unit 70 is equipped with a refrigerant piping 71, a radiator 72, a circulation pump 75, and two temperature measuring units 76a and 76b. The refrigerant piping 71 is piping for circulating refrigerant to cool the fuel cell 20, and is constituted by upstream side piping 71a and downstream side piping 71b. The upstream side piping 71a connects the outlet of the refrigerant flow path inside the fuel cell 20 and the inlet of the radiator 72. The downstream side piping 71b connects the inlet of the refrigerant flow path inside the fuel cell 20 and the outlet of the radiator 72.

The radiator 72 has a fan that takes in outside air, and cools the refrigerant by doing a heat exchange between the refrigerant of the refrigerant piping 71 and the outside air. The circulation pump 75 is provided on the downstream side piping 71b, and is driven based on a command of the control unit 10. The refrigerant is flowed inside the refrigerant piping 71 by the drive force of the circulation pump 75.

A first temperature measuring unit 76a is provided on the upstream side piping 71a, and a second temperature measuring unit 76b is provided on the downstream side piping 71b. With this embodiment, the control unit 10 detects the refrigerant temperature with each piping 71a and 71b by two temperature measuring units 76a and 76b, and detects the operating temperature of the fuel cell 20 based on the refrigerant temperature of each piping 71a and 71b. The control unit 10 may also detect the operating temperature of the fuel cell 20 based on only the measurement value of the first temperature measuring unit 76a. The control unit 10 controls the operating temperature of the fuel cell 20 by controlling the rotation count of the circulation pump 75 based on the operating temperature of the fuel cell 20.

In addition, the fuel cell system 100 is equipped with a secondary battery and a DC/DC converter (not shown in figure). The secondary battery stores the power output by the fuel cell 20 and regenerated power, and functions as a power source together with the fuel cell 20. The DC/DC converter is able to control the charge and discharge of the secondary battery and the output voltage of the fuel cell 20. Each constitutional unit of the fuel cell system 100 described above are drivable even after operation of the fuel cell 20 stops by using the power of the secondary battery.

A2. Hydrogen Pump Constitution

Figure 2:
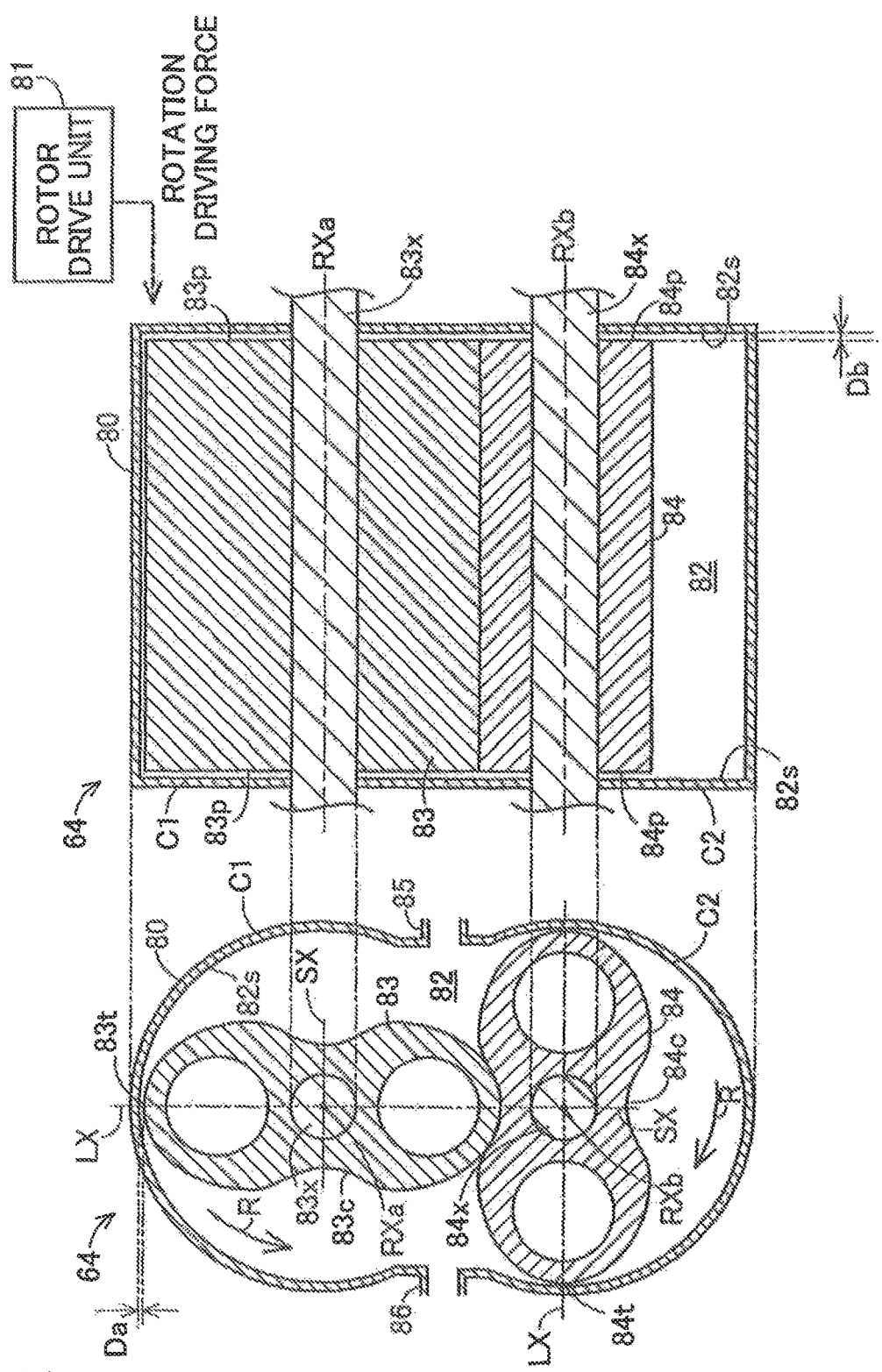
FIG. 2 is a schematic diagram showing the constitution of the hydrogen pump.

FIG. 2 is a schematic drawing showing the constitution of the hydrogen pump 64. At the left-side in FIG. 2, the schematic cross section of the hydrogen pump 64 at the perpendicular cutting surface in the axis direction of the rotation shafts RXa and RXb of rotors 83 and 84 of the hydrogen pump 64 is illustrated. The hydrogen pump 64 is equipped with a rotor housing unit 80 and a rotor drive 81. The rotor housing unit 80 correlates to the case of the hydrogen pump 64, and has a pump chamber 82 which is a sealed space on the interior. On the interior of the pump chamber 82, two rotors 83 and 84 are housed. The two rotors 83 and 84 correlate to the subordinate concept of the rotating body in the present invention. Each rotor 83 and 84 has almost the same shape, and has a so-called cross-section shape. In other words, the rotors 83 and 84 have a cross section shape for which the center part in the long axis LX direction of a roughly oval shape is constricted in a curve so as to be indented at both sides in the short axis SX direction. Each rotor 83 and 84 has two-time symmetrical rotational symmetry.

A main rotation shaft 83x is connected to the center of the first rotor 83, and a driven rotation shaft 84x is connected to the center of the second rotor 84. The rotor drive unit 81 is equipped with a motor (illustration omitted), and rotation driving force is transmitted to the first rotor 83 via the main rotation shaft 83x and rotates the first rotor 83. Also, the rotor drive unit 81 is rotated so as to have the driven rotation shaft 84x driven by the main rotation shaft 83x using gears (not shown in figure), and the second rotor 84 is rotated together with the first rotor 83. The control unit 10 shown in FIG. 1 may control the rotation count of each rotor 83 and 84 by controlling the motor of the rotor drive unit 81.

On the interior of the pump chamber 82, the two rotors 83 and 84 have the following kind of positional relationship. When the long axis LX of the first rotor 83 and the long axis LX of the second rotor 84 intersect, the end part 83t in the long axis LX direction of the first rotor 83 engages with a constricted part 84c formed at the center in the long axis LX direction of the second rotor 84. Alternatively, the end part 84t in the long axis LX direction of the second rotor 84 engages with the constricted part 83c of the first rotor 83.

The pump chamber 82 has a cross section shape for which a circle C1 with the main rotation shaft 83x as the center and a circle C2 with the driven rotation shaft 84x as the center are connected so that a portion overlaps (shown in left-side in FIG. 2). At the center portion in which the two circles C1 and C2 in the pump chamber 82 overlap, an intake port 85 and an exhaust port 86 are provided so as to open facing mutually opposite sides sandwiching the rotors 83 and 84.

As shown by arrow R in the drawing, the two rotors 83 and 84 are rotated in mutually opposite directions at the same rotation speed by the rotation driving force of the rotor drive unit 81. By doing this, intake of gas from the intake port 85 and exhausting of compressed gas from the exhaust port 86 are repeated.

It is preferable that the distance Da between the inner wall surface 82s of the pump chamber 82 and the end parts 83t and 84t in the long axis LX direction of each rotor 83 and 84 be within a range of 20 to 50 µm. It is preferable that the distance Db (shown in right-side in FIG. 2) between the end surfaces 83p and 84p of the rotors 83 and 84 in the direction along the rotation shafts RXa and RXb of each rotor 83 and 84 and the inner wall surface 82s of the pump chamber 82 facing opposite those end surfaces 83p and 84p be within a range of 10 to 60 µm. The distance Db is more preferable within a range of 15 to 25 µm. By doing this, with the freezing prevention process, it is possible to reliably guide the residual water of the pump chamber interior 82 to a frozen state extended along the inner wall surface 82s, and possible to inhibit adhesion of the hydrogen pump 64 in low-temperature environments (detailed description will be made later).

A3. Hydrogen Pump Freezing Prevention Process

Figure 3:
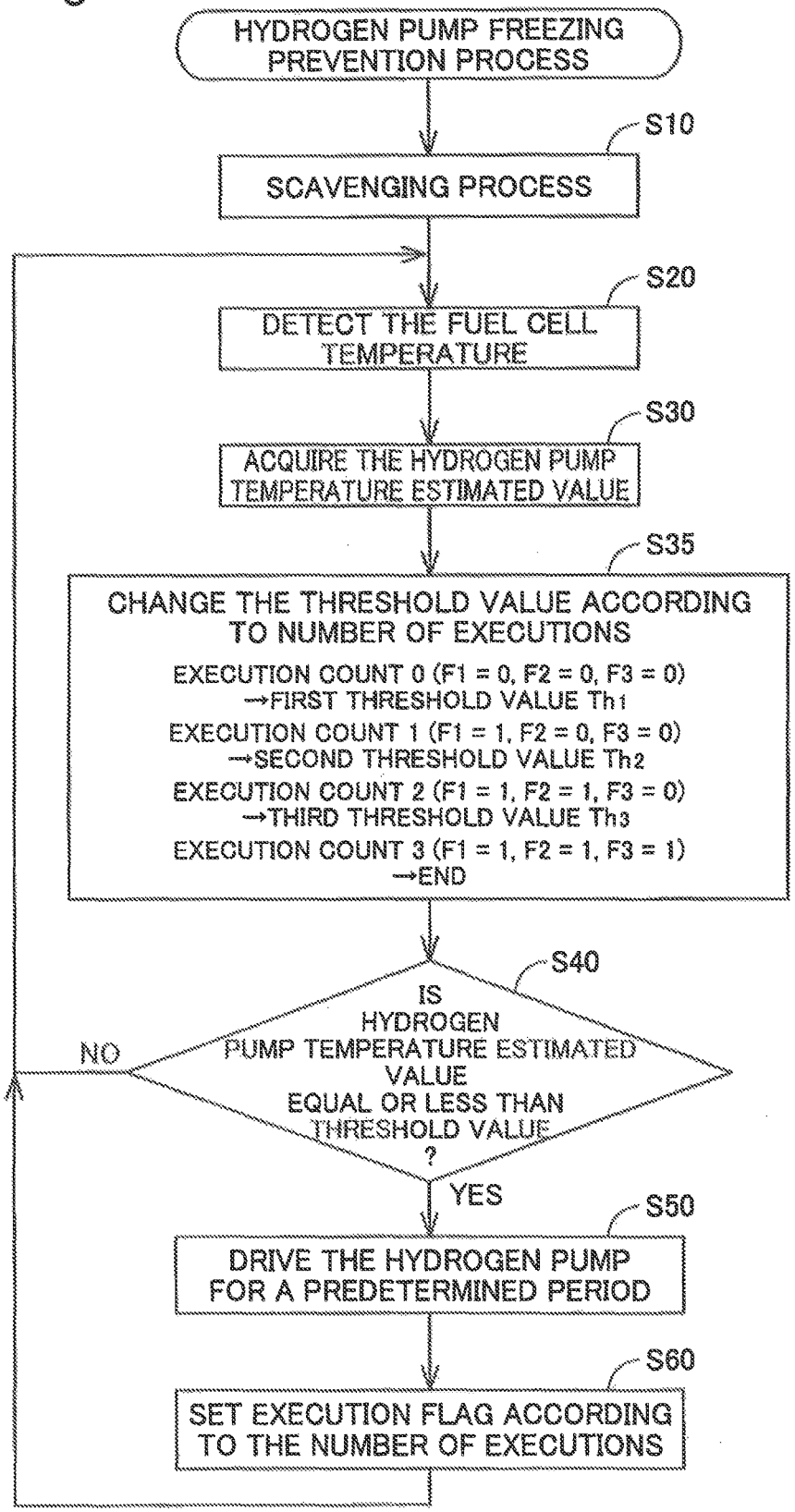
FIG. 3 is an explanatory drawing showing the flow of the hydrogen pump freezing prevention process.

FIG. 3 is an explanatory drawing showing the flow of the freezing prevention process of the hydrogen pump 64 executed by the control unit 10. The control unit 10 executes an anode-side scavenging process as the end processing when ending operation of the fuel cell 20 in the step S10. With this scavenging process, the control unit 10 drives the hydrogen pump 64, and circulates gas containing hydrogen remaining in the fuel cell 20 as purge gas. Then, it opens the drain valve 66 at a predetermined timing, and drains liquid water separated by the vapor-liquid separator 62. By doing this, it is possible to reduce the moisture content remaining in the fuel cell 20, the hydrogen pump 64, the anode-side piping 51, 61, 63 and the like. In the scavenging process of the step S10, it is also possible to execute cathode-side scavenging by driving the air compressor 32.

While operation of the fuel cell 20 is stopped, with startup at predetermined cycles, the control unit 10 executes the processing from step S20 and thereafter. With step S20, the control unit 10 detects the current temperature of the fuel cell 20 based on the measurement temperatures from the first temperature measuring unit 76a and the second temperature measuring unit 76b of the refrigerant supply unit 70. In the step S30, the control unit 10 acquires as parameters expressing the temperature of the hydrogen pump 64 the measurement values of the hydrogen pump 64 based on the temperature of the fuel cell 20 obtained in the step S10.

In this embodiment, the control unit 10 has a map expressing the uniquely correlated relationship of the temperature changes of the fuel cell 20 after operation has ended obtained by experimentation in advance or the like, and temperature changes of the hydrogen pump 64. The control unit 10 references the map, and acquires estimated values of the temperature of the hydrogen pump 64 in relation to the temperature of the fuel cell 20. The processes of steps S20 and S30 correlate to the subordinate concept of the parameter acquisition step in the present invention. Instead of the method using the map, the control unit 10 may also acquire estimated values of the temperature of the hydrogen pump based on the temperature of the fuel cell 20 using the following method, for example. First, the estimated value of the first temperature measuring unit 76a expressing the outlet temperature of the fuel cell 20 is acquired as the temperature of the fuel cell 20, and a predetermined coefficient is multiplied on that temperature to acquire the estimated value of a first heat volume that the hydrogen pump 64 has. Next, based on the outside air temperature, the estimated value of a second heat volume moving from the hydrogen pump 64 to outside is acquired. Then, by subtracting the second heat volume from the first heat volume, the estimated value of the change volume of the temperature of the hydrogen pump 64 is acquired, and the estimated value of the current hydrogen pump 64 temperature is acquired.

It is especially preferable that the estimated value of the temperature of the hydrogen pump 64 acquired in the step S30 expresses the temperature of the rotors 83 and 84 of the hydrogen pump 64 or the temperature of the inner wall surface 82s of the pump chamber 82 with the hydrogen pump 64. The estimated value of the temperature of the hydrogen pump 64 is preferably one expressing the temperature of the rotors 83 and 84 of the hydrogen pump 64. By doing this, there is an increased relatedness between the estimated value of the temperature of the hydrogen pump 64 and the possibility of the occurrence of adhesion of the rotors 83 and 84 due to freezing of moisture remaining in the hydrogen pump 64. The estimated value of the temperature of the hydrogen pump 64 is more preferably one expressing temperature of the pump chamber 82 of the hydrogen pump 64. By doing this, the environmental conditions for which it is possible to freeze residual water within the pump chamber 82 in an extended state on the inner wall surface 82s of the pump chamber 82 is more suitably reflected in the estimated value of the hydrogen pump 64.

In the step S35, based on the execution flags F1 to F3 expressing the number of executions of the rotation drive process of the hydrogen pump 64 of step S50, the control unit 10 performs the process of changing the threshold value which is the judgment condition of step S40. In this embodiment, the process of step S50 described later may be executed a maximum of 3 times, so three execution flags F1 to F3 are set in advance. 0 is set as the initial value for the execution flags F1 to F3. When the process of the first step S50 is executed, the execution flag F1 is set to 1 in the step S60. Similarly, when the process of step S50 is executed the second time, the execution flag F2 is set to 1, and when the process of step S50 is executed the third time, the execution flag F3 is set to 1.

When the execution flag F1 is 0, in other words, when the number of executions of step S50 is 0, the control unit 10 uses a first threshold value Th1 as the judging condition of step S40. When the execution flag F1 is 1, and the execution flag F2 is 0, in other words, when the number of executions of step S50 is 1, the control unit 10 uses a second threshold value Th2 as judging condition for step S40. When the execution flags F1 and F2 are 1, and the execution flag F3 is 0, in other words, when the number of executions of step S50 is 2, the control unit 10 uses a third threshold value Th3 as the judging condition for step S40. When the execution flag F3 is 1, the control unit 10 cancels execution of the processes of steps S40 to S60, and ends repeating of execution of step S50. In this case, the control unit 10 may also cancel the processing of step S20 and thereafter until the next startup of the fuel cell system 100.

All of the plurality of threshold values Th1, Th2, and Th3 used with step S40 are values set to within a predetermined temperature range that is lower than the freezing point (e.g. −10° C. or greater, less than 0° C.), and the relationship Th1>Th2>Th3 is satisfied. For example, it is possible to have the first threshold value Th1 be −1° C., the second threshold value Th2 be −3° C., and the third threshold value Th3 be −5° C. In this way, with this embodiment, the processing of step S50 is executed at a temperature lower than the freezing point, and the more the number of executions of step S50 increases, the lower the judgment threshold value of step S40. By doing this, as will be described hereafter, when the estimated value of the temperature of the hydrogen pump 64 is lowered to a temperature lower than the freezing point, the processing of step S50 is executed a plurality of times.

In the step S40, the control unit 10 judges whether or not this is a temperature for which there is a possibility of the moisture remaining inside the pump chamber 82 of the hydrogen pump 64 going to supercooling state based on the estimated values of the temperature of the hydrogen pump 64 acquired at step S30. When the estimated value of the temperature of the hydrogen pump 64 is a threshold value or less (any of the threshold values Th1 to Th3) according to the number of executions of step S50, the control unit 10 judges that there is a possibility of residual water inside the pump chamber 82 going to a supercooling state. As indicated by the arrow of "YES" at step S40, in this case, the processing of step S50 is executed.

In the step S50, the control unit 10 drives the hydrogen pump 64, and rotates the rotors 83 and 84 at a predetermined rotation speed. (e.g. about 200 to 600 rpm) for a predetermined period (e.g. about 10 to 15 seconds). The drive process of the hydrogen pump 64 in the step S50 correlates to the subordinate concept of the rotating body drive process in the present invention, and that execution step correlates to the subordinate concept of the rotation body drive step in the present invention. By temporary rotation drive for the predetermined period of rotors 83 and 84 in the step S50, adhesion of rotors 83 and 84 due to freezing of moisture remaining inside the pump chamber 82 is suppressed. The mechanism for that is described later.

In the step S40, when the estimated value of the temperature of the hydrogen pump 64 is greater than the threshold value, the control unit 10 regards this as there not being a possibility of the residual water inside the pump chamber 82 of the hydrogen pump 64 going to a supercooling state, and enters a standby state until the next startup cycle as indicated by the arrow of "NO" at step S40. Also, detection of the temperature of the fuel cell 20 with the predetermined cycle and judgment of the temperature of the hydrogen pump 64 is repeated in the steps S20 to S40. After the hydrogen pump 64 is driven in the step S50, the control unit 10 sets one of the execution flags F1 to F3 to 1 according to the number of executions of step S50 in the step S60 as described above. After that, the control unit 10 enters a standby state until the next startup cycle, and repeats detection of the temperature of the fuel cell 20 at the predetermined cycle and judgment of the temperature of the hydrogen pump 64 in the steps S20 to S40.

Figure 4:
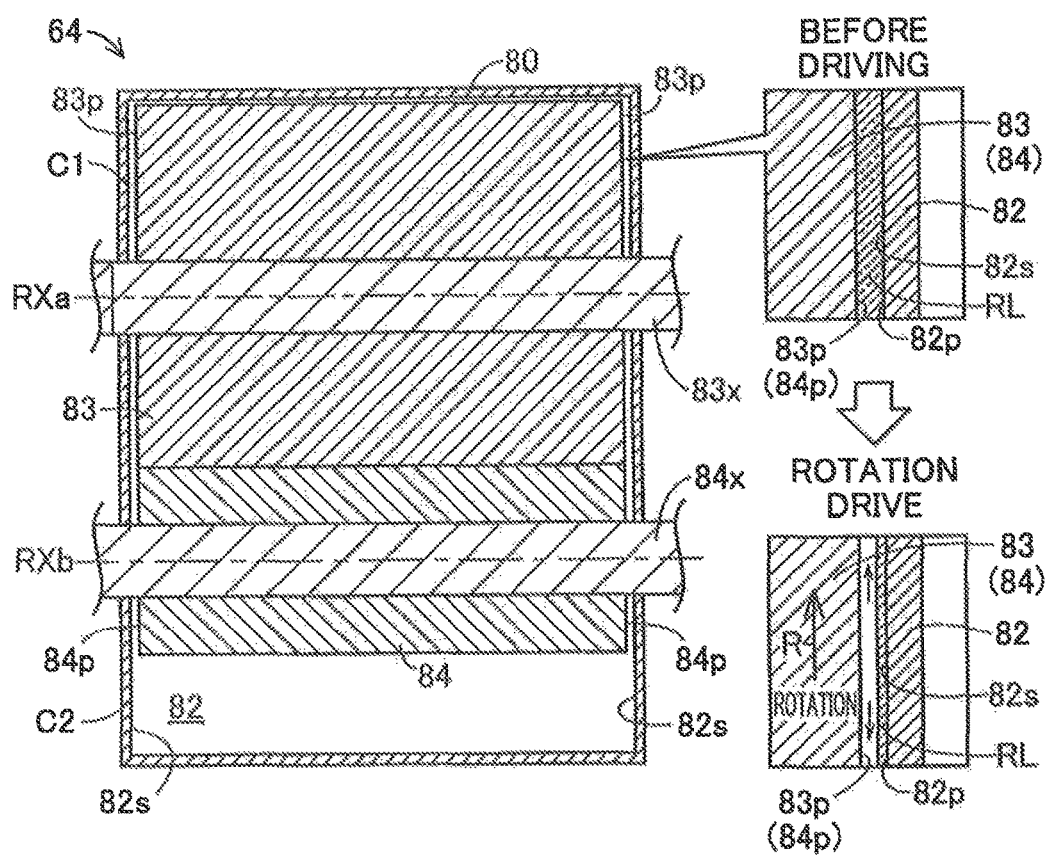
FIG. 4 is a schematic diagram for describing the mechanism of inhibiting adhesion of the rotor due to freezing of residual water.

FIG. 4 is a schematic diagram for describing the mechanism of suppressing the adhesion of rotors 83 and 84 due to freezing of the residual water RL at step S50. After ending operation of the fuel cell 20, driving of the hydrogen pump 64 stops, and when moisture remains inside the pump chamber 82, there is a possibility of that residual water RL entering between the rotors 83 and 84 and the inner wall surface 82s of the pump chamber 82. When the temperature of the hydrogen pump 64 is lower than the freezing point, and the residual water RL is in a supercooling state, when the hydrogen pump 64 is driven and the rotors 83 and 84 are rotated, the residual water RL is in a state extended in a thin film state along the inner wall surface 82s of the pump chamber 82. In a low-temperature environment, the inner wall surface 82s of the pump chamber 82 is further to the outside than the rotors 83 and 84, and the temperature is low, so the extended residual water RL is guided to freezing at the inner wall surface 82s. In this way, when the residual water RL inside the hydrogen pump 64 is supercooling, the rotation of the rotors 83 and 84 of the hydrogen pump 64 becomes an opportunity for the residual water RL inside the hydrogen pump 64 to freeze, and the residual water RL freezes only at the inner wall surface 82s side for which the temperature is low. Therefore, having the residual water RL extended between the inner wall surface 82s and the rotors 83 and 84 freeze, and having the rotors 83 and 84 adhere in a state connected to the inner wall surface 82s by the frozen residual water RL is inhibited. Thus, a rotatable state for the rotors 83 and 84 is ensured. As with this embodiment, when the hydrogen pump 64 is a roots type, the surface area of the end surfaces 83p and 84p of the rotors 83 and 84 are large, and a large volume of residual water RL exists between those end surfaces 83p and 84p and the inner wall surface 82s. In this kind of case as well, in a low-temperature environment, if the process of step S50 is executed, it is possible to suppress adhesion of the rotors 83 and 84 due to freezing of the residual water RL.

In the drive process of the hydrogen pump 64 of step S50 shown in FIG. 3, it is preferable that the hydrogen pump 64 be driven at a low rotation count. In specific terms, the control unit 10 may drive the hydrogen pump 64 at a lower rotation count than the average rotation count of the hydrogen pump 64 during operation of the fuel cell 20. The control unit 10 may drive the hydrogen pump 64 at the minimum rotation count during operation control of the fuel cell system 100 including the scavenging process, or may drive at the minimum rotation count allowed for the hydrogen pump 64. By doing this, energy consumption by driving of the hydrogen pump 64 when operation of the fuel cell 20 is stopped is suppressed, and a decrease in system efficiency is suppressed.

In the fuel cell system 100 of this embodiment, as described hereafter, when the estimated value of the temperature of the hydrogen pump 64 is in a continuously decreasing trend in the predetermined temperature range described above, the drive process of the hydrogen pump 64 of step S50 is repeated a plurality of times.

FIG. 5 is an explanatory drawing of an example of a timing chart showing the drive timing of the hydrogen pump 64 during execution of the freezing prevention process. In FIG. 5, the change over time of the temperature of the fuel cell 20 is illustrated by solid line flag Ga, and the change over time of the temperature of the hydrogen pump 64 in relation to that is illustrated by dot-dash line flag Gb. As noted above, when the temperature $T_{FC}$ of the fuel cell 20 is detected, the estimated temperature $T_P$ which is the estimated value of the temperature of the hydrogen pump 64 in relation to that detected temperature $T_{FC}$ is acquired in the steps S20 to S30. Initially, since the execution flag F1 is 0, at step S40, when it is detected that the estimated temperature $T_P$ is a predetermined threshold value $Th_1$ or less that is lower than the freezing point, the drive process of the hydrogen pump 64 is executed for the first time in the steps S35 to S50.

After execution of step S50 the first time, the execution flag F1 is set to 1 in the step S60. After the standby state has gone by, when the estimated temperature $T_P$ of the hydrogen pump 64 decreases, the execution flag F1 is 1, and the execution flag F2 is 0, so when it goes to the predetermined second threshold temperature $Th_2$ or less, the drive process of the hydrogen pump 64 is executed the second time in the steps S35 to S50. Also, the execution flag F2 is set to 1 in the step S60. When the estimated temperature $T_P$ of the hydrogen pump 64 decreases even further, the execution flags F1 and F2 are 1, and the execution flag F3 is 0, so when it goes to the predetermined third threshold temperature $Th_3$ or less, the drive process of the hydrogen pump 64 is executed for the third time in the steps S35 to S50. Also, the execution flag F3 is set to 1 in step S60.

In this way, by the drive process of the hydrogen pump 64 being repeated a plurality of times when the temperature of the hydrogen pump 64 is in a decreasing trend, adhesion of the rotors 83 and 84 due to freezing of the residual water is more reliably inhibited. The number of executions of step S50 is not limited to three times. The control unit 10 may also repeat the drive process of the hydrogen pump 64 using an even smaller threshold value within the predetermined temperature range for which there is a possibility of occurring supercooling to the residual water. Also, when the estimated temperature $T_P$ of the hydrogen pump 64 is within the predetermined temperature range, the control unit 10 may repeat the drive process of the hydrogen pump 64 a plurality of times with a predetermined cycle regardless of the temperature changes thereafter.

As described above, with the fuel cell system 100 of the present invention, an opportunity to freeze with rotation of rotors 83 and 84 is given to residual water for which supercooling has occurred inside the hydrogen pump 64, and it is possible to have that residual water freeze at the inner wall surface 82s of the pump chamber 82 for which the temperature is low. Therefore, freezing of the residual water inside the hydrogen pump 64 extending between the rotors 83 and 84 and the inner wall surface 82s of the pump chamber 82 is inhibited, and adhesion of the rotors 83 and 84 of the hydrogen pump 64 due to freezing of the residual water is suppressed. Thus, a decrease in the starting properties of the fuel cell system 100 in low-temperature environments is suppressed.

B. Modifications
B1. Modification 1:
In the embodiments noted above, the hydrogen pump 64 is constituted by a roots type pump having cocoon type rotors 83 and 84. In contrast to this, the hydrogen pump 64 may be constituted by a roots type pump having a so-called trefoil type rotor, or may be constituted by a pump other than the roots type. The hydrogen pump 64 is sufficient as long as it is a type of pump equipped with a rotating body, and for example may be a screw type pump. The present invention may be applied not only to a pump but also to an air compressor.

B2. Modification 2:
In the fuel cell system 100 of the embodiments noted above, the control unit 10 acquires the estimated temperature of the hydrogen pump 64 based on the temperature of the fuel cell 20. In contrast to that, it is also possible to provide a temperature measuring unit capable of directly measuring the temperature of the hydrogen pump 64, and to have the control unit 10 acquire measured values of the temperature of the hydrogen pump 64 as parameters expressing the temperature of the hydrogen pump 64. Alternatively, it is also possible for the control unit 10 to acquire the estimated temperature of the hydrogen pump 64 based on the outdoor temperature.

B3. Modification 3:
In the embodiments noted above, when the parameter expressing the temperature of the hydrogen pump 64 is in a predetermined temperature range for which it is possible for the residual water inside the pump chamber 82 to go to a supercooling state, the drive process of the hydrogen pump 64 of step S50 is executed. The drive process of the hydrogen pump 64 of step S50 may be executed when the parameter expressing the temperature of the hydrogen pump 64 shows a temperature lower than the freezing point.

B4. Modification 4:
In the freezing prevention process of the hydrogen pump 64 with the embodiments noted above, when the estimated value of the temperature of the hydrogen pump 64 is decreased, the drive process of the hydrogen pump 64 of step S50 is executed a plurality of times repeatedly. In contrast to this, with the freezing prevention process, it is also possible to execute the drive process of the hydrogen pump 64 of step S50 only one time. The constitution may also be such that the process of step S50 is executed a plurality of times with the estimated value of the temperature of the hydrogen pump 64 within a predetermined temperature range that is lower than the freezing point, for which there is no switch to the change state of the estimated value of the temperature of the hydrogen pump 64.

B5. Modification 5:
In the fuel cell system 100 of the embodiments noted above, on the hydrogen pump 64, by rotating the rotors 83 and 84 when the operation of the fuel cell 20 is stopped, the freezing prevention process is executed that inhibits adhesion due to freezing of the rotors 83 and 84. In contrast to this, the freezing prevention process of the embodiment noted above may also be applied to a pump other than the hydrogen pump 64 used for supplying gas.

The present invention is not limited to the embodiments, working examples, and modifications described above, and the realization of various constitutions is possible in a range which does not depart from the gist of the present invention. For example, it is possible for the technical features in the embodiments, working examples, and modifications which correspond to the technical features in each of the aspects according to the summary of the invention section to be replaced or combined as appropriate in order to solve a portion or all of the problems described above, or in order to achieve a portion of all of the effects described above. Also, where a technical feature is not described as one which is essential in the present specifications, it may be removed as appropriate. Also, a portion or all of the functions and processes realized using software with the embodiments and modifications noted above may also be realized using hardware. Also, a portion or all of the functions and processes realized using hardware may be realized using software. As hardware, for example, it is possible to use various types of circuits such as integrated circuits, discrete circuits, or circuit modules combining those circuits, for example.

What is claimed is:
1. A fuel cell system comprising:
a fuel cell;
a pump comprising a rotating body and a case for housing the rotating body, used to supply reaction gas to the fuel cell; and a control unit for controlling driving of the pump, wherein
the control unit acquires a parameter expressing the temperature of the pump, and executes a rotating body drive process that rotates the rotating body of the pump for a predetermined period so that residual water is guided to freeze only at an inner wall surface of the case when it is detected based on the parameters that the temperature of the pump is a temperature at which supercooling of moisture occurs, the temperature is equal to or less than a threshold value set within a predetermined range lower than the freezing point, while the fuel cell operation is stopped.

2. A fuel cell system according to claim 1, wherein
the control unit stores a plurality of threshold values as the threshold value, and
the control unit determines whether it is possible to execute each rotating body drive process using a threshold value among the plurality of threshold values smaller than a previous threshold value used in the previous executed rotating body drive process for each execution of the rotating body drive process.

3. A fuel cell system according to claim 1, wherein
the control unit executes the rotating body drive process a plurality of times.

4. A fuel cell system according to claim 1, wherein
the control unit obtains a measurement value of the temperature of the fuel cell, and acquires the temperature of the pump, which is obtained from the measurement value of temperature of the fuel cell by using a relationship between a temperature of the fuel cell and the temperature of the pump that is prepared in advance, as the parameter expressing the temperature of the pump.

5. A fuel cell system according to claim 1, wherein
in the rotating body drive process, the control unit rotates the rotating body at a rotational speed which is smaller than the rotational speed of the pump during operation of the fuel cell.

6. A fuel cell system according to claim 1, wherein
the pump is a circulation pump that sends hydrogen exhausted from an outlet of the fuel cell to an inlet of the fuel cell.

7. A control method of a fuel cell system that includes a pump which has a rotating body and a case for housing the rotating body, used to supply reaction gas to the fuel cell, the method comprising:

acquiring a parameter expressing the temperature of the pump while the operation of a fuel cell is stopped, and
rotating the rotating body of the pump for a predetermined period so that residual water is guided to freeze only at an inner wall surface of the case when, based on the parameters, it is detected that the temperature of the pump is a temperature at which supercooling of moisture occurs, the temperature is equal to or less than a threshold value set within a predetermined range lower than the freezing point.

8. A control method of a fuel cell system according to claim 7, further comprising;
storing a plurality of threshold values as the threshold value; and
setting to a next threshold value among the plurality of threshold values that is lower than a previous threshold value, each time the rotating body drive step is executed.

9. A control method of a fuel cell system according to claim 7, wherein
rotating the rotating body is executed a plurality of times.

10. A control method of a fuel cell system according to claim 7, wherein
acquiring the parameter includes obtaining a measurement value of the temperature of the fuel cell, and acquiring the temperature of the pump, which is obtained from the measurement value of temperature of the fuel cell by using a relationship between a temperature of the fuel cell and the temperature of the pump that is prepared in advance, as the parameter expressing the temperature of the pump.

11. A control method of a fuel cell system according to claim 7, wherein
rotating the rotating body at a rotational speed which is smaller than the rotational speed of the pump during operation of the fuel cell.

12. A control method of a fuel cell system according to claim 7, wherein
the pump is a circulation pump that takes hydrogen exhausted from the fuel cell and sends it again to the fuel cell.

* * * * *